July 30, 1957   J. J. RONGEN ET AL   2,801,346
ELECTRICAL DIPOLE HAVING A COMPARATIVELY LOW DIRECT
CURRENT AND A COMPARATIVELY HIGH
ALTERNATING CURRENT IMPEDANCE
Filed April 4, 1956

INVENTOR
JACOBUS JOHANNES RONGEN
HENRI HERMAN VAN ABBE
BY
AGENT

United States Patent Office 2,801,346
Patented July 30, 1957

2,801,346

ELECTRICAL DIPOLE HAVING A COMPARATIVELY LOW DIRECT CURRENT AND A COMPARATIVELY HIGH ALTERNATING CURRENT IMPEDANCE

Jacobus Johannes Rongen and Henri Herman van Abbe, Eindhoven, Netherlands, assignors, by mesne assignments, to North American Philips Company, Inc., New York, N. Y., a corporation of Delaware Application April 4, 1956, Serial No. 576,171

Claims priority, application Netherlands April 5, 1955

1 Claim. (Cl. 307—88.5)

The present invention relates to an electrical two terminal network having a comparatively low direct current resistance and a comparatively high alternating current impedance. More particularly, the invention relates to a network of the type described utilizing a transistor. The network of the present invention may advantageously be substituted for a heavy and clumsy choke coil, for example for suppressing voltage variations produced across an electrical load-impedance by supply voltage and/or load-impedance variations.

The present invention has for its object to provide an advantageous electrical two terminal network by utilization of the fact that the alternating current impedance of a transistor between its emitter and collector electrodes largely exceeds its direct current resistance, and by utilization of suitable alternating current inverse feedback and direct voltage feedback.

In accordance with the present invention, the two terminal network comprises the series-combination of the collector-emitter path of a transistor and of a first resistor, which is connected to the emitter of the transistor and the value of which is at least several times that of the internal emitter resistance of said transistor. The base of the transistor is connected to its collector through a second large resistor, and said base is connected to the end of the first resistor remote from the emitter through a capacitor, the impedance of said capacitor with respect to any voltage variations being at least several times smaller than that of the first resistor. The arrangement is such that the base of the transistor is biased in the conducting direction by a direct voltage applied across the network, via the second resistor, and that, as regards the said voltage variations, the network exhibits an impedance considerably larger than its direct current resistance.

Figure 2:
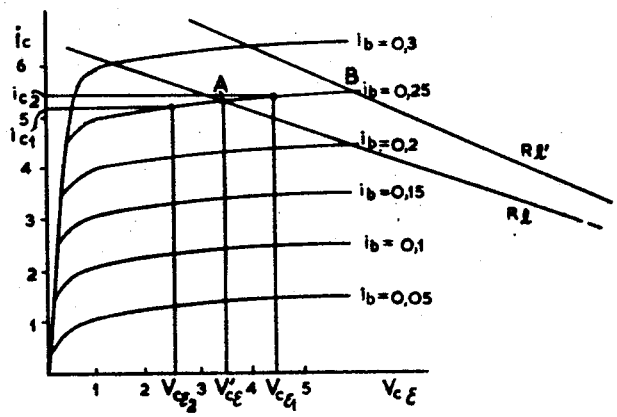
Figure 1:
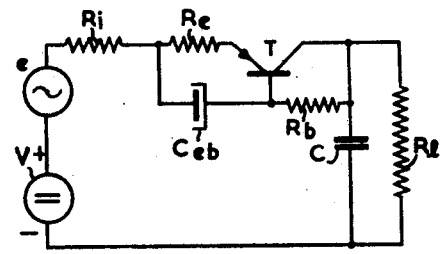

In order that the invention may be readily carried into effect, an embodiment thereof will now be described with reference to the accompanying drawing, in which:

Fig. 1 is a schematic diagram of an embodiment of a circuit arangement comprising an embodiment of the two terminal network of the present invention; and Fig. 2 is a graphical presentation provided to aid in explaining the operation of the circuit arrangement of Fig. 1.

The circuit arrangement shown in Fig. 1 comprises a supply source delivering a direct voltage V with a superimposed variable or ripple voltage $e$ and having an internal resistance $R_i$. A load $R_1$, which is bypassed by a capacitor C, is connected across the supply source via the emitter-collector path of a transistor T and a resistor $R_e$ connected in series with said transistor. The end of the resistor $R_e$ remote from the emitter electrode of the transistor is connected through a large capacitor, for example an electrolytic capacitor $C_{eb}$, to the base of the said transistor. The base of the transistor is connected to the collector of the said transistor through a resistor $R_b$.

If the capacitor $C_{eb}$ and the resistor $R_e$ were not present, the ratio S between the ripple voltage across the ends of the load resistor $R_1$ and the ripple voltage $e$ at the input would be $$S = \frac{R_1}{R_s R_1 j\omega C + R_s + R_1}$$

$R_s$ represents the so-called differential resistance and S represents the suppression factor of the two terminal network $T - R_b$. If $1/\omega C$ is small relative to $R_1$, one may write:

$$S = \frac{1}{1 + j\omega C R_s}$$

and if $R_s$ greatly exceeds $$\frac{1}{C}$$

then $$S = \frac{1}{jR_s \omega C}$$

Then $$\frac{1}{R_s} = \frac{1}{r_c'} + \frac{\alpha'}{R_b}$$

wherein $r_c'$ is the output resistance and $\alpha'$ is the current amplification of the transistor in grounded emitter-connection.

Connecting the capacitor $C_{eb}$ in the circuit is equivalent to short-circuiting the alternating voltage between the emitter and the base of the transisor. Instead of being approximately equal to $$\frac{e[r_e(1+\alpha') + r_b]}{R_b}$$

said alternating voltage now becomes equal to $$\frac{e}{R_b} \cdot \frac{1}{j\omega C_{eb}}$$

The graph of Fig. 2 represents the load current $i_c$ of the transistor T as a function of the emitter-collector voltage $V_{ce}$, with the base-current $i_b$ as a parameter. It is seen that for a given load resistance $R_1$ and a given base-current $i_b$, and with an equally given direct current voltage V with a superimposed ripple voltage $e$, the values of $i_c$ and $V_{ce}$ in the absence of the condenser $C_{eb}$ vary between $i_{c_1}$ and $i_{c_2}$, and between $V_{ce_1}$ and $V_{ce_2}$ respectively. If the condenser $C_{eb}$ is connected in the circuit, it has the effect of maintaining the emitter current $i_e$ practically constant, so that, also due to the interconnected resistance $R_e$, which is chosen larger than the emitter resistance $r_e$, the transistor behaves with respect to the ripple voltage $e$ practically as a transistor with grounded base electrode and features a much larger differential resistance Rs, as well as a much larger factor S. Indeed, as is well known, the right-hand branches of the curves $i_e = f(V_{ce})$ for a constant $i_e$ are much flatter than those of the corresponding curves for a constant $i_b$ (Fig. 2).

If, in this circuit, the load resistance $R_1$ slightly varies, for example from $R_1$ to $R_1'$, the working-point of the transistor, particularly its collector-emitter voltage $V_{ce}$, shifts considerably, for example from point A to point B (Fig. 2). This is sometimes undesirable and, particularly in the case of transistors with a low $\alpha'$, may involve excessive collector dissipation.

The resistor $R_e$ brings about a current inverse-feedback with respect to alternating voltages only. Since the base of the transistor is connected to its collector through the resistor $R_b$, the circuit arrangement has a much lower internal resistance with regard to current variations which are slow relatively to the time constant of the circuit $R-C_{eb}$, where R comprises the parallel-connected resistances $R_b$ and $R_x$, which is in turn equal to the sum of $R_e(1+\alpha')$ and of the emitter-base direct current resistance. If the voltage between the emitter and collector, and consequently also between the emitter and base increases, the base-current increases due to the direct current feedback across the resistor $R_b$, so that the output current likewise increases. In the two terminal network according to the invention, $R_e$ should be maintained as low as possible, since it is traversed by the supply current and, if its value is too high, it reduces the efficiency of the network excessively. Furthermore, the direct voltage across $R_e$ should not be too high, since otherwise the direct voltage across $C_{eb}$ also increases and this capacitor can no longer be of a low voltage electrolytic type. Thus, $R_e$ is given a compromise value whereby it is at least several times larger than the internal emitter resistance $r_e$ of the transistor. $R_b$ is determined by the required base-current $i_b$, and its value is comparable to that of the collector resistance $r_c$. It should not be too high, since only a low voltage is available across it. With respect to alternating voltages, $R_b$ is connected substantially in parallel with the transistor. If the $\alpha'$ of the transistor is small, $R_b$ should also be small, in order that the transistor be able to deliver the required direct current, and this low resistance considerably reduces the suppression factor S. In the circuit arrangement described, the network according to the invention provides an excellent smoothing of the supply current with respect to load impedance variations.

The transistor shown in Fig. 1 is a junction transistor of pnp type.

While the invention has been described by means of a specific example and in a specific embodiment, we do not wish to be limited thereto, for obvious modifications will occur to those skilled in the art without departing from the spirit and scope of the invention.

What is claimed is:

An electrical two terminal network, characterized in that it comprises the series-combination of the collector-emitter path of a transistor and of a resistor, which is connected to the emitter of this transistor and the value of which at least several times exceeds that of the internal emitter-resistance of the transistor, and in that it furthermore comprises a further large resistor through which the base of the transistor is connected to the collector, and a capacitor through which said base is connected to the end of the first resistor remote from the emitter, the impedance of said capactior with respect to any voltage variations being at least several times smaller than that of he first resistor, the arrangement being such that the base of the transistor is biased in the conducting direction by a direct voltage applied across the network, via the second resistor, and that, as regards the said voltage variations, the network exhibits an impedance considerably larger than its direct current resistance.

References Cited in the file of this patent
UNITED STATES PATENTS
2,585,078     Barney _____ Feb. 12, 1952